US009464180B2

(12) United States Patent
Hofstätter et al.

(10) Patent No.: US 9,464,180 B2
(45) Date of Patent: Oct. 11, 2016

(54) RECYCLING OF BOREHOLE SOLIDS IN POLYMERS

(75) Inventors: Herbert Hofstätter, Vöcklabruck (AT); Clemens Holzer, Graz (AT)

(73) Assignee: Montanuniversität Leoben, Leoben (AT)

( * ) Notice: Subject to any disclaimer, the term of this patent is extended or adjusted under 35 U.S.C. 154(b) by 0 days.

(21) Appl. No.: 14/344,169

(22) PCT Filed: Sep. 14, 2012

(86) PCT No.: PCT/EP2012/068165
§ 371 (c)(1),
(2), (4) Date: Jun. 3, 2014

(87) PCT Pub. No.: WO2013/037978
PCT Pub. Date: Mar. 21, 2013

(65) Prior Publication Data
US 2014/0343219 A1   Nov. 20, 2014

(30) Foreign Application Priority Data

Sep. 16, 2011   (EP) ..................... 11181725

(51) Int. Cl.
| C08K 3/26 | (2006.01) |
| C08K 5/00 | (2006.01) |
| C08K 3/34 | (2006.01) |
| C08F 2/44 | (2006.01) |
| C08J 3/20 | (2006.01) |

(52) U.S. Cl.
CPC . *C08K 3/26* (2013.01); *C08F 2/44* (2013.01); *C08J 3/20* (2013.01); *C08K 3/34* (2013.01); *C08K 5/00* (2013.01); *C08K 2003/265* (2013.01)

(58) Field of Classification Search
USPC ........................................ 524/425, 445, 451
See application file for complete search history.

(56) References Cited

U.S. PATENT DOCUMENTS

| 2,700,655 A * | 1/1955 | Endres et al. ................. 524/71 |
| 3,203,921 A | 8/1965 | Rosenfelder |
| 4,013,615 A | 3/1977 | Ohashi et al. |
| 4,123,417 A | 10/1978 | Finberg |
| 4,263,186 A | 4/1981 | Blueemel |
| 4,599,117 A * | 7/1986 | Luxemburg ................. 134/25.1 |
| 4,678,607 A | 7/1987 | Reitz |
| 5,021,500 A | 6/1991 | Puydak |
| 5,107,874 A | 4/1992 | Flanagan |
| 5,213,446 A * | 5/1993 | Dovan ........................ 405/129.3 |
| 6,337,107 B1 | 1/2002 | Symons |
| 6,616,743 B1 | 9/2003 | Yap et al. |
| 2003/0192812 A1* | 10/2003 | Reddoch ............................ 209/1 |
| 2008/0211140 A1* | 9/2008 | Burns et al. ............. 264/331.17 |
| 2009/0071510 A1* | 3/2009 | Hancock .................... 134/22.18 |
| 2009/0192250 A1 | 7/2009 | Ijichi et al. |
| 2009/0277632 A1 | 11/2009 | Frazier |
| 2010/0130387 A1 | 5/2010 | Davis et al. |

FOREIGN PATENT DOCUMENTS

| CN | 101914233 A * | 12/2010 |
| GB | 1101950 A | 2/1968 |
| GB | 1550207 A | 8/1979 |
| WO | WO 8201737 A1 | 5/1982 |
| WO | WO 2012/172332 * | 12/2012 |

OTHER PUBLICATIONS

CN101914233 English Machine Translation, Jul. 23, 2015.*
Schlumberger Oilfield Glossary—Drill Cuttings Definition, Jul. 24, 2015.*
Schlumberger Oilfield Glossary—Drill Mud Definition, Jul. 24, 2015.*
Jackson, A, "Synthetic versus Mineral Fluids in Lubrication" p. 3 Section 3 and 3.1, Presented at the International Tribology Conference, Dec. 2-4, 1987.*
Office Action issued in a related patent application before the Eurasian patent Organization citing the above-referenced U.S. patent.
English language translation of NPL item 1.

* cited by examiner

*Primary Examiner* — Randy Gulakowski
*Assistant Examiner* — Christopher M Rodd
(74) *Attorney, Agent, or Firm* — Robert A. Blaha; Smith Tempel Blaha LLC

(57) ABSTRACT

There is provided a method of fabricating a composite material, the method comprising providing borehole solids originating from a borehole in the earth and embedding the borehole solids in a base material thereby forming the composite material, wherein the base material comprises a polymer. According to an embodiment, the borehole solids contain oil, e.g. on a surface thereof. The oil containing borehole solids may be preprocessed before embedding or may be directly embedded in the base material without preprocessing. Such embodiments allow for a recycling of oil contaminated borehole solids while providing a resource for a filler for polymers.

9 Claims, 2 Drawing Sheets

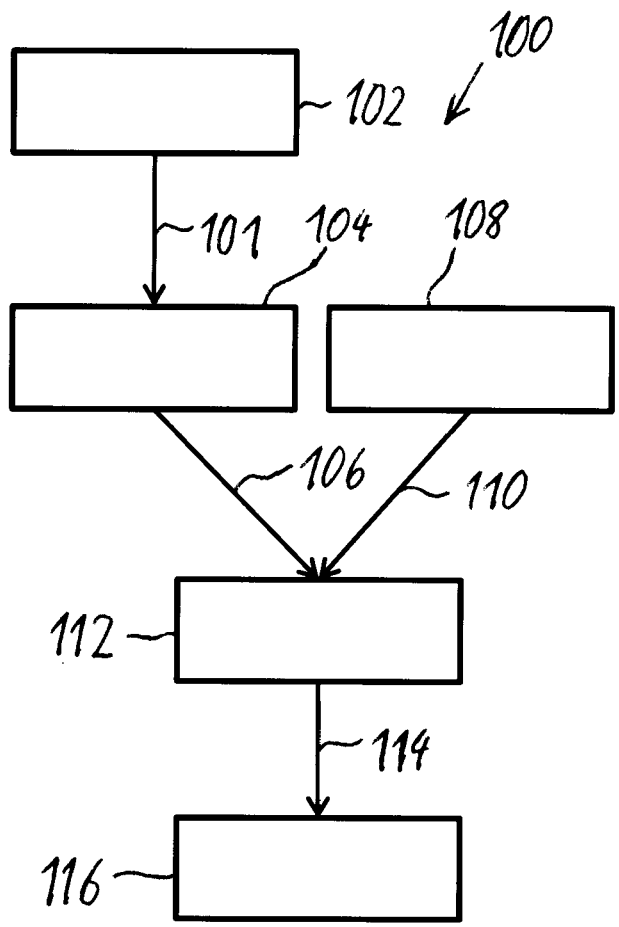
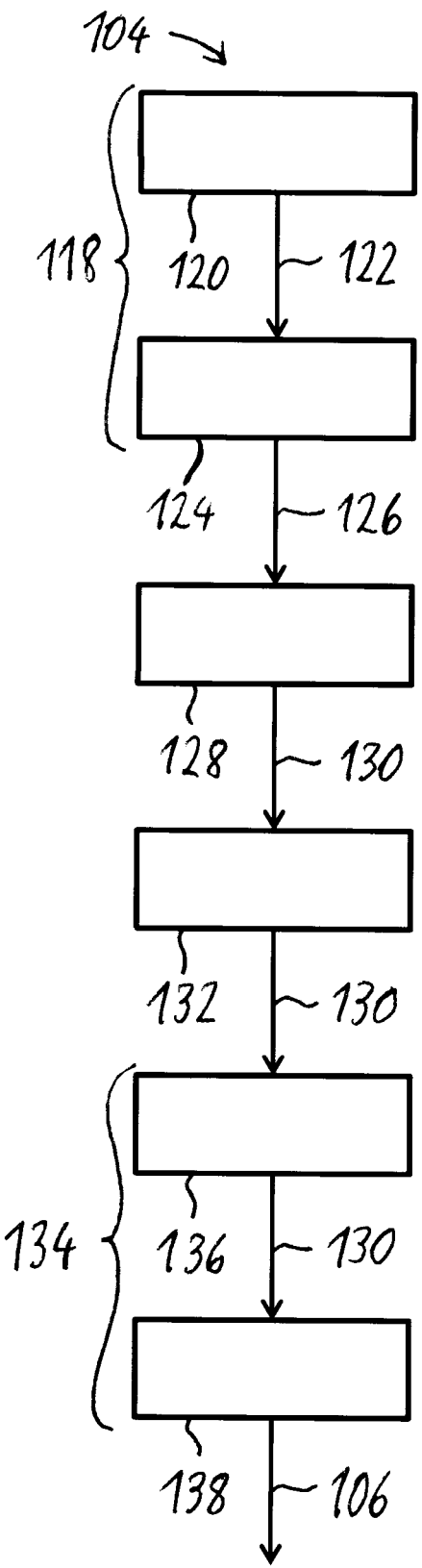
Fig. 1
Fig. 2

RECYCLING OF BOREHOLE SOLIDS IN POLYMERS

CROSS-REFERENCE TO RELATED APPLICATION

This application claims the benefit of the filing date of European Patent Application 11181725.0 filed Sep. 16, 2011, the disclosure of which is incorporated herein by reference.

TECHNICAL FIELD

The present invention relates to the field of disposing borehole solids originating from a borehole in the earth.

BACKGROUND

In drilling of boreholes for hydrocarbons such as oil and/or gas or water from subterranean deposits or in drilling for geothermal energy, it is common practice to use a rotary drilling procedure in which a drill bit is rotated at the bottom of the borehole by means of rotating hollow drill pipe which extends to the surface. The drill pipe is driven from the surface and a circulating fluid commonly referred to as a drilling fluid or drilling mud is pumped through the drill pipe where it emerges through openings in the drill bit to cool the same and is returned to the surface in the annular space between the drill pipe and the walls of the borehole. The bit might also be rotated by a downhole motor which is powered by the drilling fluid as well.

A disposal of borehole solids is usually expensive due to the fact that borehole solids are usually contaminated with fluids present in the borehole such as oil or drilling fluid.

In view of the above-described situation, there exists a need for an improved technique that enables to dispose borehole solids while substantially avoiding or at least reducing one or more of the above-identified problems.

SUMMARY

This need may be met by the subject-matter according to the independent claims. Advantageous embodiments of the herein disclosed subject-matter are described by the dependent claims.

According to an embodiment of a first aspect of the herein disclosed subject-matter, there is provided a method of fabricating a composite material, the method comprising: providing borehole solids originating from a borehole in the earth; embedding the borehole solids in base material thereby forming the composite material wherein the base material comprises a polymer.

This aspect of the herein disclosed subject-matter is based on the idea that borehole solids can be recycled by embedding the borehole solids in a base material which comprises a polymer. In this way, the problem of disposing borehole solids is solved by upgrading the borehole solids as a resource for the fabrication of composite materials.

In accordance with an embodiment, the composite material is a solid material. According to a further embodiment, the composite material is an engineering material which may be used for producing goods.

According to an embodiment, the borehole solids have on a surface thereof a borehole liquid being present in the borehole, e.g. during drilling of the borehole. For example, according to an embodiment, the borehole liquid being present on the borehole solids includes or consists of at least one hydrocarbon such as oil, gas, etc. According to a further embodiment, the borehole liquid being present on the borehole solids includes or consists of water.

According to a further embodiment, the borehole liquid being present on the borehole solids includes or consists of a drilling fluid which is used for assisting the drilling operation, e.g. by cooling the drill bit or by transporting the borehole solids to the surface.

According to an embodiment, embedding the borehole solids in the base material includes: providing the base material; mixing the borehole solids and the base material. The mixing of the borehole solids and the base material can be performed by any suitable means, for example by a screw compounder, a kneading machine, etc.

According to an embodiment, embedding the borehole solids in the base material includes embedding the borehole solids with the borehole liquid thereon in the base material. For example, according to an embodiment where the borehole solids have hydrocarbon on its surfaces, the borehole solids may be embedded in the base material without removing the hydrocarbon. For example, depending on the polymer used, the hydrocarbon on the borehole solids may have an effect similar to a softener.

According to an embodiment, the method further comprises preprocessing the borehole solids, e.g. chemically preprocessing and/or physically preprocessing the borehole solids. According to an embodiment, the method comprises preprocessing the borehole solids with the borehole liquid thereon, in particular to thereby at least partially remove the borehole liquid on the borehole solids, thereby resulting in preprocessed borehole solids; wherein embedding the borehole solids in the base material includes embedding the preprocessed borehole solids in the base material. According to a further embodiment, the method comprises preprocessing the borehole solids with the borehole liquid thereon, in particular to thereby at least partially alter the borehole liquid on the borehole solids, thereby resulting in preprocessed borehole solids; wherein embedding the borehole solids in the base material includes embedding the preprocessed borehole solids in the base material. Hence, according to an embodiment, instead of embedding unprocessed borehole solids in the base material, preprocessed borehole solids are embedded in the base material.

According to a further embodiment, the preprocessing of the borehole solids includes physically treating the borehole solids to thereby alter the borehole liquid. According to a further embodiment, preprocessing the borehole solids includes physically treating the borehole solids to thereby at least partially remove the borehole liquid.

According to a further embodiment, preprocessing the borehole solids includes chemically treating the borehole solids to thereby alter at least part of the borehole liquid. For example, physical treatment of the borehole solids may include or consist of a heat treatment. According to further embodiment, preprocessing of the borehole solids includes suspending the borehole solids in a solvent, e.g. in a mixture of solvents. For example, a mixture of solvents may include a polar solvent and a non-polar solvent, e.g. water and ethanol. According to a further embodiment, the preprocessing of the borehole solids includes silanization of the borehole solids. For example, according to an embodiment the silanization is achieved by adding a silanization agent.

According to other embodiments, other adhesion promoters or coupling agents are applied to the borehole solids to thereby improve the coupling or the adhesion of the borehole solids and the base material.

According to a further embodiment, the preprocessing includes drying of a liquid, e.g. of the borehole liquid or the altered borehole liquid on the borehole solids.

According to an embodiment, the method comprises preprocessing the borehole solids to thereby alter the borehole solids, thereby resulting in preprocessed borehole solids; wherein embedding the borehole solids in the base material includes embedding the preprocessed borehole solids in the base material. For example, in an embodiment, altering the borehole solids comprises altering the size of the borehole solids. According to another embodiment, altering the borehole solids comprises changing the shape of the borehole solids.

According to an embodiment, the borehole solids act as a filler in the base material. In the polymer industry the use of fillers has a long tradition. For example, fillers may be used for enhancing e.g. mechanical properties or for cost reduction. Usually these fillers are mined and especially treated for this successful use in polymers. If the types of minerals of the borehole solids are very similar to the traditionally mined fillers, similar achievements can be reached by using borehole solids as polymer fillers. Since the properties of the polymer/filler compound are depending mostly on the polymer type and on the amount of filler and its particle size, shape or the functional surface, almost all type of borehole solids can be used as fillers.

According to an embodiment of a second aspect of the herein disclosed subject-matter, there is provided a composite material comprising a base material comprising a polymer; and borehole solids from a borehole in the earth, the borehole solids being embedded in the base material.

According to an embodiment, the borehole solids are minerals. According to a further embodiment, the borehole solids comprise or consist of minerals that are suitable as filler materials in polymers. According to an embodiment of the second aspect, the composite material is configured in accordance with embodiments as described with regard to the first aspect. For example, according to an embodiment, the base material is configured according to embodiments of the first aspect. According to a further embodiment, the borehole solids of the composite material are configured in accordance with embodiments of the first aspect.

According to embodiments of a third aspect, there is provided a use of borehole solids as a filler for a base material containing a polymer. According to embodiments of the third aspect, the borehole solids are configured in accordance with embodiments of the first aspect and/or the second aspect.

According to a further embodiment of the third aspect, the base material is configured in accordance with embodiments of the first aspect and/or the second aspect.

In drilling boreholes in the earth, e.g. in drilling for hydrocarbons, in drilling for water or in drilling for geothermal energy it is common practice to use a drilling fluid which is circulated through the drill pipe. The drilling fluid, upon emerging from the well or borehole at the surface, may be physically and/or chemically processed to remove the solids and other undesirable contaminants and is normally treated chemically to maintain certain chemical and physical properties of the fluid depending upon particular drilling conditions encountered. The drilling fluid after being reconstituted is normally recirculated by pumps to be forced downwardly through the drill pipe, this circulation being generally continuous during drilling. Circulation of the drilling fluid may be interrupted occasionally such as when an additional section of drill pipe is added at tile top of the string of pipe or when the entire length of drill pipe is withdrawn to replace or repair the drill bit.

The drilling fluid may be capable of performing many varied functions which are required in a successful drilling procedure and therefore may possess certain desirable chemical and physical properties. The drilling fluid may have sufficient viscosity to suspend and remove the solids from the borehole and may have sufficient gel strength to hold solids in suspension, especially when circulation of the fluid is interrupted. It also may have sufficient density to exert suitable pressure to the sides of the borehole to prevent the entrance of fluids into the borehole from the earth formation being penetrated, and it may have low fluid loss to prevent undue loss of fluid into the formation by its deposition on the borehole sides such as by forming an impervious filter cake or deposit. Furthermore, a dense drilling fluid may be used to compensate for the pressure the borehole is exposed to by the surrounding earth formation. In general weighting agents are used, e.g. calcium chloride ($CaCl_2$), calcium carbonate ($CaCO_3$), barium sulfate ($BaSO_4$), iron oxide ($Fe_2O_3$) or the like. However, these inert substances may tend to separate or to precipitate from the drilling fluid, in particular when used in high concentrations. This may lead to safety-related problems during the drilling, e.g. since the flow of the drilling fluid may stop, the drill bit may jam in the borehole, or the weighting agents may already separate in a reservoir before pumped into the borehole. This separation problem will particularly occur in case no shearing force is applied to the drilling fluid or the circulation of the drilling fluid in the borehole is stopped. Although the rheologic characteristics of the drilling fluid may be adjusted by additives, e.g. polymers, such additives tend to have a limited temperature stability. Depending of the particular boundary conditions in the borehole e.g. geology, lithology, formation pressure, borehole trajectory etc. the drilling fluid might be either water based or oil based. However, residuals of the drilling fluids always adhere at the surface of the borehole cuttings drilled and depending on the type of the contamination the cuttings must be treated before disposal. In case of oil contaminated cuttings there has been no application for recycling the cuttings. The same applies to the fines coming along in the oil and gas production.

Generally herein the term "borehole solids" does not impose a limitation on the size of the solids. Rather, the term borehole solids includes for example drilling cuttings, i.e. material that is removed during drilling to thereby generate the borehole. Furthermore, the term borehole solids also includes base sediments or fines that occur in the oil and gas production from the hydrocarbon that is delivered through the already drilled borehole. According to an embodiment, the borehole solids contain hydrocarbon, e.g. on a surface thereof. However, according to an embodiment, the hydrocarbon is oil, e.g. crude oil. However, the hydrocarbon on the borehole solids is not necessarily crude oil originating from geological cavities. Rather, in an embodiment the hydrocarbon on the borehole solids is hydrocarbon (e.g. oil) that is added to assist the drilling of the borehole. Such drilling assisting oil may be contained in the drilling fluid.

According to an embodiment, borehole cuttings from drilling of boreholes or solids from the oil production process are used as fillers in the base material. Almost all types of cuttings can be used as fillers, no matter if they are drilled with water-based drilling fluid or with oil-based drilling fluid or if they are containing a certain amount of water or oil, or not.

According to an embodiment, borehole cuttings which contain a borehole liquid (e.g. hydrocarbon and/or water) are used as they are as fillers in the base material. According to a further embodiment, the amount of borehole liquid on the borehole cuttings is reduced in a single step process or in a multi-step process. The removal of the borehole liquid and the type of process used for removing the borehole liquid depends on the amount of borehole liquid that can be tolerated in the specific application.

Embodiments of the herein disclosed subject-matter provide for a recycling process for hydrocarbon (e.g. oil) contaminated borehole solids by embedding them in a suitable base material containing a polymer. According to a further embodiment, water wet borehole solids are recycled by embedding these borehole solids in a suitable base material containing a polymer.

Hydrocarbon contaminated solids according to an embodiment are pre-treated before disposal, e.g. by physical treatment or chemical treatment. Upgrading borehole solids and in particular hydrocarbon contaminated borehole solids as a resource in other industries, e.g. as a filling material for a polymer containing base material, is provided.

Hence, according to an embodiment a waste-free drilling and production method is provided. According to an embodiment, oil drilling cuttings and production byproducts are used as a resource for fabricating a composite material. According to a further embodiment, efficiency of polymer production can be increased. Furthermore, according to an embodiment, polymer fillers from alternative sources are provided.

In former times, without the herein disclosed subject matter, hydrocarbon contaminated borehole cuttings as well as solids from the hydrocarbon production must have been pretreated before disposal in a disposal area. However, in accordance with embodiments of the herein disclosed subject-matter these materials are embedded in a base material which contains a polymer, thereby providing a waste-free drilling and production concept for hydrocarbons. Hence, in accordance with an embodiment, the hydrocarbon contaminated borehole cuttings and/or solids from the hydrocarbon production are no longer waste, but are a resource for the fabrication of a composite material.

Recycling borehole solids and in particular recycling hydrocarbon contaminated material obtained from borehole drilling, and using it as a component of a composite material, e.g. using it as a filling material for polymers, provides an important contribution from an environmental point of view since no residuals are left neither from the drilling process nor from the fabrication of hydrocarbon. Hence the cost for disposal of hydrocarbon contaminated cuttings and solids, which is an essential cost factor in the petroleum industry, can be obviated according to embodiments of the herein disclosed subject-matter.

Naturally, the composition of the borehole solids is not constant during drilling or during hydrocarbon production. Further, the size of the borehole solids may change during drilling of the borehole. However, in accordance with an embodiment, the size of the borehole solids used for embedding in the base material is in a predetermined range. This may be achieved for example by one or more sieving stages. According to a further embodiment, the size of the borehole solids is reduced by breaking and/or milling before embedding the size changed borehole solids in the base material.

In the above there have been described and in the following there will be described exemplary embodiments of the subject matter disclosed herein with reference to a composite material and a respective method of fabrication.

It has to be pointed out that of course any combination of features relating to different aspects of the herein disclosed subject matter is also possible. In particular, some embodiments have been or will be described with reference to apparatus type features whereas other embodiments have been or will be described with reference to method type features. However, a person skilled in the art will gather from the above and the following description that, unless other notified, in addition to any combination of features belonging to one aspect also any combination between features relating to different aspects or embodiments, for example even a combination of apparatus type features and method type features is considered to be disclosed with this application. Further method type features are considered to disclose also corresponding device type features and vice versa.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWINGS

FIG. 1 illustrates a method of fabrication of a composite material according to embodiments of the herein disclosed subject matter.

FIG. 2 illustrates preprocessing of borehole solids according to embodiments of the herein disclosed subject matter.

DETAILED DESCRIPTION

Figure 3:
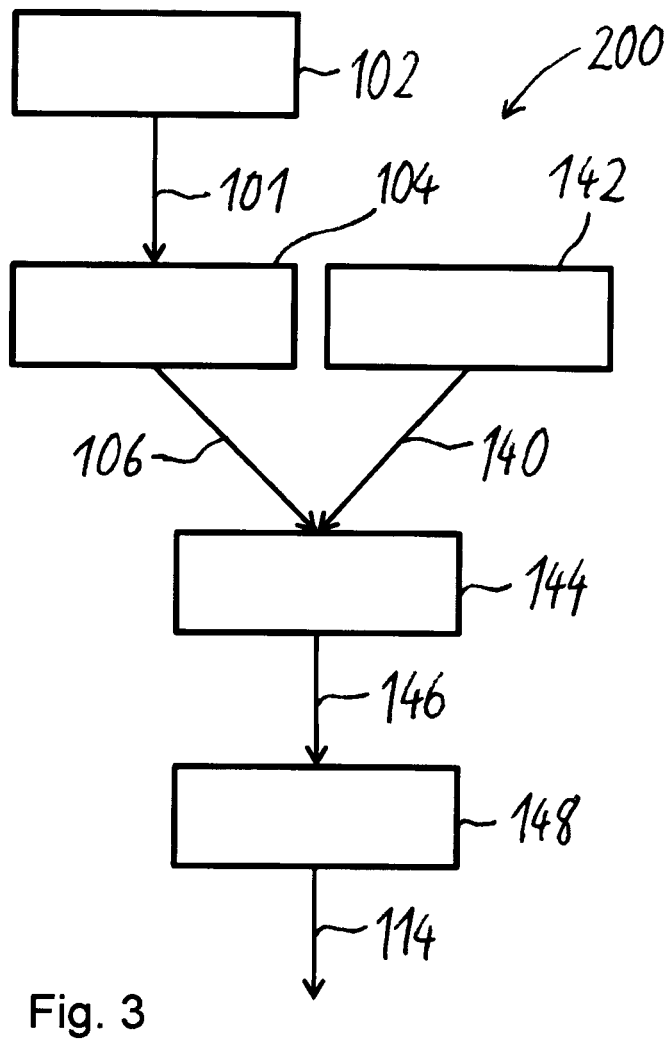
FIG. 3 illustrates a further method of fabrication of a composite material according to embodiments of the herein disclosed subject matter.

The illustration in the drawings is schematic. It is noted that in different figures, similar or identical elements are provided with the same reference signs.

FIG. 1 illustrates a method 100 of fabrication of a composite material according to embodiments of the herein disclosed subject matter.

In accordance with an embodiment, borehole solids 101 originating from a borehole in the earth are provided at 102. According to an embodiment, the borehole solids 101 include at least one mineral, e.g. at least one of calcium carbonate, talc, and layered silicates. According to an embodiment, the method comprises drilling a borehole in the earth by loosening and subsequently removing solids, i.e. the borehole solids, from the borehole. According to an embodiment, drilling the borehole is performed for making accessible hydrocarbon resources, water resources or geothermal energy resources in the earth, just to name some examples. Removing solids from the borehole may be performed e.g. by removing a drilling fluid from the borehole and extracting the borehole solids from the drilling fluid. However, the borehole solids may be extracted at any production stage that is associated with the drilling operation or that follows the drilling operation (e.g. oil production).

According to an embodiment, the borehole solids 101 are preprocessed, indicated at 104. According to an embodiment, the borehole solids themselves are preprocessed, e.g. by adjusting a particle size. According to a further embodiment, a contamination layer on a surface of the borehole solids is preprocessed. Generally herein, preprocessing may include at least one of chemical preprocessing and physical preprocessing. Preprocessing 104 results in preprocessed borehole solids 106.

In accordance with a further embodiment, the method 100 includes providing a base material 110. Providing the base material 110 is indicated at 108 in FIG. 1. In accordance with an embodiment, the base material 110 includes at least one polymer. Hence, the base material comprises or consists of at least one polymer. For example, in an embodiment the base material includes at least one of a semicrystalline polymer and an amorphous polymer. The semicrystalline polymer may be e.g. polypropylene (PP). The amorphous polymer may be e.g. polystyrol (PS). According to an embodiment, the polymer may be susceptible to a softener/plasticizer. For example, the polymer may be polyvinylchloride (PVC).

According to a further embodiment, the method 100 includes embedding the borehole solids 106 in the base material 110. This is indicated at 112 in FIG. 1. For example, according to an embodiment, the borehole solids 106 are mixed with the base material 110. The mixing may be performed by any suitable method and/or means, e.g. by means of a twin screw compounder or a co-kneader. By embedding the borehole solids 106 in the base material 110 a composite material 114 according to embodiments of the herein disclosed subject matter is formed. According to an exemplary embodiment the amount of borehole solids in the base material may be in a range between 0,1 wt. % and 80 wt. %. However, the actual content may be selected depending on the properties of the borehole solids and the base material, and the desired properties of the composite material 114.

According to an embodiment, the composite material 114 is reshaped, indicated at 116 in FIG. 1. Reshaping 116 may be applied to obtain a desired shape of the composite material, e.g. a tube, etc.

According to an embodiment of a method of fabricating a composite material, the preprocessing 104 of the borehole solids 101 is omitted. According to a further embodiment, the reshaping 116 of the composite material 114 is omitted.

FIG. 2 illustrates preprocessing 104 of the borehole solids 101 according to embodiments of the herein disclosed subject matter.

According to an embodiment, the preprocessing 104 includes physically treating the borehole solids 101, indicated at 118 in FIG. 2. For example, according to an embodiment, the physical treatment 118 of the borehole solids 101 includes adjusting the particle size of the borehole solids 101 to a predetermined range, e.g. by at least one of breaking, milling, sieving and any other suitable method. The adjustment of the particle size is indicated at 120 in FIG. 2, resulting in size adjusted borehole solids 122. According to other embodiments, the physical treatment 118 includes adjustment of the particle shape of the borehole solids 101 (not shown in FIG. 2).

According to a further embodiment, the physical treatment 118 of the borehole solids includes suspending the borehole solids 101 in a liquid, e.g. in a solvent. According to an embodiment, the solvent includes at least one of water and ethanol. For example, in an embodiment, the physical preprocessing 118 includes suspending the borehole solids 101, which have been adjusted in its particle size, in a mixture of water and ethanol. Suspending the borehole solids 101 is indicated at 124 in FIG. 2 and results in a suspension 126. According to an embodiment the type and/or composition of the solvent may be chosen depending e.g. on the desired properties of the solvent that are necessary for providing a suspension of the borehole solids. Such a desired property is e.g. the viscosity of the solvent.

According to an embodiment borehole solids have on a surface thereof a borehole liquid being present in the borehole during drilling of the borehole. In such a case, the preprocessing 104 may include preprocessing the borehole solids with the borehole liquid thereon to thereby at least partially remove and/or alter the borehole liquid on the borehole solids 101. For example, in an embodiment, the solvent is configured for at least partially dissolving the borehole liquid being present on the borehole solids 101.

According to a further embodiment, the preprocessing 104 includes a chemical treatment of the borehole solids, indicated at 128 in FIG. 2. For example, according to an embodiment, the chemical treatment includes adding a chemically reactive agent to the borehole solids 101. For example, in an embodiment, the chemical treatment 128 includes adding the chemically reactive agent to the suspension 126, resulting in a mixture 130 of both components. According to an embodiment, the chemical treatment includes an adjustment of the functional surface of the borehole solids 101. For example, the chemically reactive agent may be configured for promoting a coupling between the borehole solids 101 and the base material 110. For example, according to an embodiment, the chemically reactive agent is a silanization agent.

According to a further embodiment, the solvent has a further function besides providing a suspension of the borehole solids. For example, in an embodiment, the solvent may be adapted for being capable to dissolve the chemically reactive agent.

According to a further embodiment, the preprocessing 104 includes a chemical treatment combined with a physical treatment, e.g. a heat treatment. For example, according to an embodiment, the mixture 130 containing the chemically reactive agent and the borehole solids is heated to a predetermined reaction temperature. The heating of the mixture 130 is indicated at 132. For example, in an embodiment the suspension 126 with the added silanization agent is heated to 60 degrees Celsius for a predetermined duration which depends on the desired degree of silanization of the surface of the borehole solids.

According to a further embodiment, after the predetermined duration the mixture 130 is subjected to cooling down to room temperature (20 degrees Celsius). According to a further embodiment, after completing a chemical treatment (or the combined chemical/physical treatment) the borehole solids 101 are subjected to a further physical treatment 134. According to an embodiment, the further physical treatment 134 includes a stirring operation 136. According to an embodiment, the stirring operation is performed at room temperature. According to a further embodiment, the further physical treatment includes a drying operation 138. By means of the drying operation 138 the liquid being present on the borehole solids 101 is dried. Hence, in an embodiment altering the liquid on the borehole solids includes drying the liquid on the borehole solids. According to an embodiment, the drying operation is performed at a predetermined drying temperature, e.g. 130 degrees Celsius. However, it should be understood that the predetermined drying temperature depends on the type of liquid being present on the borehole solids.

The preprocessing 104 according to embodiments described above results in preprocessed borehole solids 106. According to an embodiment, the preprocessing of the borehole solids 106 results in a coating of the borehole solids. In an exemplary embodiment the coating includes functional molecules which promote a bonding between the borehole solids and the base material.

It should be understood that preprocessing according to the herein disclosed subject matter may include one or more of the preprocessing embodiments described with regard to FIGS. 1 and 2. An exemplary preprocessing operation includes all preprocessing embodiments described with regard to FIG. 2.

FIG. 3 illustrates a further method 200 of fabrication of a composite material according to embodiments of the herein disclosed subject matter.

The method 200 illustrated in FIG. 3 is similar to the method 100 illustrated in FIG. 1 except that not a base material but rather a precursor 140 of a base material 110 is provided. Providing the precursor 140 is indicated at 142 in FIG. 3. Features (101, 102, 104, 106) that have already been described with regard to FIG. 1 are provided with the same reference signs as in FIG. 1 and the description thereof is not repeated here.

According to the method 200, the precursor 140 and the preprocessed borehole solids 106 are mixed, indicated at 144, thereby providing a mixture 146 which contains the preprocessed borehole solids 106 and the precursor 140. Thereafter, the precursor 140 in the mixture 146 is transformed into the base material, thereby resulting in the composite material 114. Transforming the precursor 140 into the base material is indicated at 148 in FIG. 3. The composite material 114 may then be reshaped (not shown in FIG. 3). According to an embodiment, the mixture 146 is shaped (e.g. by means of a mould) before the precursor 140 is transformed into the base material. According to an embodiment, the precursor comprises monomers and the precursor is transformed into the base material by crosslinking the monomers, thereby forming the polymer of the base material. According to other embodiments other precursors may be used. According to an embodiment, the transformation of the precursor into the base material is a curing process.

Having regard to FIG. 1 and FIG. 3 it is noted that in an embodiment where the preprocessing 104 is omitted the borehole solids 101 are used instead of the preprocessed borehole solids 106.

Figure 4:
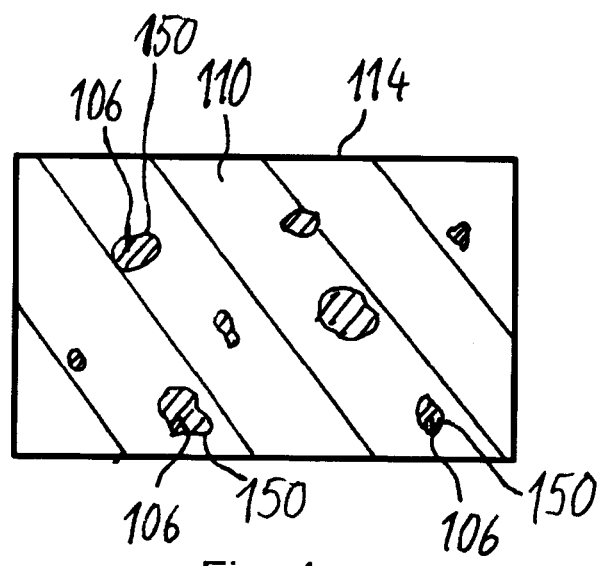
FIG. 4 shows a composite material in accordance with embodiments of the herein disclosed subject matter.

FIG. 4 shows a composite material 114 in accordance with embodiments of the herein disclosed subject matter.

The composite material 114 includes a base material 110 in the form of a polymer. In an embodiment, the base material consists of at least one polymer. Embedded in the base material 110 are borehole solids originating from a borehole in the earth, some of which are indicated at 106 in FIG. 4. In accordance with an embodiment, the borehole solids 106 are preprocessed borehole solids which have been preprocessed in accordance with embodiments of the herein disclosed subject matter. According to other embodiments, the borehole solids are not preprocessed (not shown in FIG. 4). According to a further embodiment, the borehole solids contain a borehole liquid 150 such as oil, e.g. on a surface thereof. It should be understood that depending on actual method used for fabrication of the composite material, the borehole liquid 150 that is initially present on the borehole solids 106 is at least partially mixed with the base material 110.

It is noted that the borehole solids 106 in FIG. 4 are not drawn to scale. Rather FIG. 4 serves to illustrate some aspects of the composite material 114 according to embodiments of the herein disclosed subject matter. According to an embodiment, the size of the borehole solids 106 is in the range of the size of known filler particles for polymers.

According to embodiments of the herein disclosed subject matter the borehole solids contain oil, e.g. on a surface thereof. The oil may be crude oil originating from an oil field in the earth. Further, the oil may be processing oil (e.g. synthetic oil) that is added to the drill string or the drill bit for supporting the drilling operation. Borehole solids having oil thereon can be directly subjected to a fabrication method for fabricating a composite material according to embodiments of the herein disclosed subject matter. Hence not only the recycling or disposal of the borehole solids is unnecessary but rather a source of fillers for base materials such as polymers is obtained. According to an embodiment, the preprocessed borehole solids contain oil, e.g. on a surface thereof. According to other embodiments, the preprocessing 104 is completely omitted for borehole solids which contain oil. As mentioned above, the oil of oil containing borehole solids may act as a plasticizer for the polymer.

It should be noted that although a plurality of embodiments as well as specific combinations of embodiments of the herein disclosed subject matter are described above, any two or more of these embodiments may be combined to arrive at advantageous methods and advantageous composite materials. Any such combination of embodiments of the herein disclosed subject matter is considered to be disclosed with this application.

It should be noted that the term "comprising" does not exclude other elements or steps and the "a" or "an" does not exclude a plurality. Further, the term "comprising" also includes "consisting of". For example the feature that the base material comprises a polymer includes an embodiment where the base material consists of a single polymer. Further, this feature also includes an embodiment where the base material consists of two or more polymers. Further, this feature also includes an embodiment where the base material consists of at least one polymer and at least one further component. It should also be noted that reference signs in the claims should not be construed as limiting the scope of the claims.

In order to recapitulate the above described embodiments of the present invention one can state:

There is provided a method of fabricating a composite material, the method comprising providing borehole solids originating from a borehole in the earth and embedding the borehole solids in a base material thereby forming the composite material, wherein the base material comprises a polymer. According to an embodiment, the borehole solids contain oil, e.g. on a surface thereof. The oil containing borehole solids may be preprocessed before embedding or may be directly embedded in the base material without preprocessing. Such embodiments allow for a recycling of oil contaminated borehole solids while providing a resource for a filler for polymers.

LIST OF REFERENCE SIGNS 100, 200 Method of fabricating a composite material
101 borehole solids
102 providing borehole solids
104 preprocessing the borehole solids
106 preprocessed borehole solids
108 providing a base material
110 base material
112 embedding the borehole solids in the base material
114 composite material
116 reshaping the composite material
118 physically treating the borehole solids
120 adjusting a particle size of the borehole solids 122 size adjusted borehole solids
124 suspending the borehole solids in a liquid
126 suspension
128 chemically treating the borehole solids in the suspension
130 mixture of chemically reactive agent and suspension
132 heating of the mixture
134 further physical treatment of the borehole solids
136 stirring operation
138 drying operation
140 precursor
142 providing the precursor
144 mixing precursor and borehole solids
146 mixture
148 transforming the precursor into a base material
150 borehole liquid

The invention claimed is:

1. Method of fabricating a composite material, the method comprising:
   providing borehole solids originating from a borehole in the earth;
   providing a base material comprising a polymer;
   embedding the borehole solids as a polymer filler in the base material thereby forming the composite material, wherein the borehole solids have on a surface thereof a borehole liquid; and
   preprocessing the borehole solids with the borehole liquid thereon, thereby resulting in preprocessed borehole solids;
   wherein embedding the borehole solids in the base material includes embedding the preprocessed borehole solids in the base material,
   wherein preprocessing the borehole solids includes chemically treating the borehole solids with the borehole liquid thereon,
   wherein the borehole solids include base sediments or fines that occur in a hydrocarbon that is delivered through the borehole.

2. Method according to claim 1, wherein embedding the borehole solids in the base material includes:
   mixing the borehole solids and the base material.

3. Method according to claim 1, wherein embedding the borehole solids in the base material includes:
   providing a precursor of said base material;
   mixing the precursor and the borehole solids;
   thereafter transforming the precursor into the base material.

4. Method according to claim 3, wherein the precursor includes monomers; and
   transforming the precursor into the base material includes cross-linking the monomers, thereby forming the polymer.

5. Method according to claim 1, wherein embedding the borehole solids in the base material includes:
   embedding the borehole solids with the borehole liquid thereon in the base material.

6. Method according to claim 1, wherein preprocessing the borehole solids includes physically treating the borehole solids.

7. Method according to claim 1, wherein the composite material is a plastic.

8. Composite material comprising:
   a base material comprising a polymer; and
   preprocessed borehole solids originating from a borehole in the earth, the preprocessed borehole solids being embedded in the base material as a polymer filler and having a borehole liquid on the surface thereof,
   wherein the borehole solids include base sediments or fines that occur in a hydrocarbon that is delivered through the borehole,
   wherein the preprocessed borehole solids include chemically treated borehole solids with the borehole liquid thereon.

9. A method of using borehole solids as a polymer filler for a base material containing a polymer, the method comprising:
   delivering of a hydrocarbon through a borehole, wherein the borehole solids have a borehole liquid on the surface thereof, and wherein the borehole solids include base sediments or fines, which occur in the hydrocarbon are used as the borehole solids; and
   preprocessing the borehole solids with a borehole liquid thereon, thereby resulting in preprocessed borehole solids, wherein preprocessing the borehole solids includes chemically treating the borehole solids with the borehole liquid thereon.

* * * * *